(12) United States Patent
Senti

(10) Patent No.: US 12,708,495 B2
(45) Date of Patent: Aug. 18, 2026

(54) MANUFACTURING DEVICE FOR MANUFACTURING A DENTAL OBJECT

(71) Applicant: Ivoclar Vivadent AG, Schaan (LI)

(72) Inventor: Theresa Sujata Maria Senti, Triesenberg (LI)

(73) Assignee: Ivoclar Vivadent AG, Schaan (LI)

( * ) Notice: Subject to any disclaimer, the term of this patent is extended or adjusted under 35 U.S.C. 154(b) by 316 days.

(21) Appl. No.: 18/325,797

(22) Filed: May 30, 2023

(65) Prior Publication Data

US 2023/0414332 A1 Dec. 28, 2023

(30) Foreign Application Priority Data

Jun. 14, 2022 (EP) .................................... 22178970

(51) Int. Cl.
*A61C 13/20* (2006.01)
*A61C 13/00* (2006.01)
*G06T 7/00* (2017.01)

(52) U.S. Cl.
CPC .......... *A61C 13/20* (2013.01); *A61C 13/0006* (2013.01); *G06T 7/00* (2013.01); *G06T 2207/20081* (2013.01); *G06T 2207/20084* (2013.01)

(58) Field of Classification Search
CPC ........ G05B 2219/45167; G05B 19/401; G05B 19/4099; G05B 2219/33027; A61C 13/0004; A61C 13/0022; B23Q 17/2471; G06T 2207/20084
See application file for complete search history.

(56) References Cited

U.S. PATENT DOCUMENTS

2009/0180118 A1* 7/2009 Feichtinger ........... F27B 17/025 356/402
2011/0069301 A1 3/2011 Marzok et al.
2011/0212419 A1 9/2011 Schweiger
2014/0113237 A1* 4/2014 Rohner ..................... F27B 5/14 219/390
2018/0028294 A1* 2/2018 Azernikov ......... A61C 13/0004
2018/0200955 A1 7/2018 Hoelldorfer et al.
2020/0166909 A1* 5/2020 Noone ................... G06N 20/00
2020/0173917 A1 6/2020 Bettermann
2021/0053169 A1* 2/2021 Benzinger .......... A61C 13/0004
2021/0077232 A1* 3/2021 Rohner ............. B23Q 17/2428
2021/0294297 A1 9/2021 Maushart et al.

FOREIGN PATENT DOCUMENTS

DE 102020203763 A1 10/2020

* cited by examiner

*Primary Examiner* — Yuzhen Shen

(74) *Attorney, Agent, or Firm* — Ann M. Knab; Thad McMurray

(57) ABSTRACT

A manufacturing device (100) for manufacturing a dental object (101), including an electronic camera (103) for capturing an image data set (107) of the dental object (101) to be processed; and a controller (105) for determining the control data for manufacturing the dental object (101) based on the image data set (107).

12 Claims, 3 Drawing Sheets

MANUFACTURING DEVICE FOR MANUFACTURING A DENTAL OBJECT

CROSS-REFERENCE TO RELATED APPLICATIONS

This application claims priority to European Patent Application No. 22178970.4 filed on Jun. 14, 2022, the disclosure of which is incorporated herein by reference in its entirety.

TECHNICAL FIELD

The present invention relates to a manufacturing device for manufacturing a dental object and a manufacturing method for manufacturing.

BACKGROUND

Currently, dental objects are manufactured manually, so that a dental technician selects the manufacturing parameters on the respective manufacturing device himself. For example, the dental technician selects the correct programs for the manufacturing devices, which support to use for the dental object, which rules to observe when placing the dental object, or with which materials and in which situations the manufacturing parameters must be adjusted and how. In reality, however, it is apparent that this specific expertise in the manufacture of dental objects is not available to all users.

US 20110069301, 20090180118, 20110212419, 20180200955, 20200166909, 20200173917, 20210053169, and 20210294297 are directed to methods and/or devices for manufacturing and/or monitoring ceramic, metal, dental or other material objects and are hereby incorporated by reference in their entirety.

SUMMARY

Therefore, it is the technical object of the present invention to simplify and automate the manufacture of a dental object by a manufacturing device.

This technical object is solved by subject-matter according to the independent claims. Technically advantageous embodiments are the subject-matter of the dependent claims, the description and the drawings.

According to a first aspect, the technical object is solved by a manufacturing device for manufacturing a dental object, including: an electronic camera for capturing an image data set of the dental object to be processed; and a controller or controller for determining the control data for manufacturing the dental object on the basis of the image data set. The manufacturing devices achieves, for example, the technical advantage that manufacturing parameters can be automatically set as possible control data depending on the dental object. In this way, manufacturing the dental object can be simplified and an erroneous manual selection of wrong manufacturing parameters by a user can be prevented.

In a technically advantageous embodiment of the manufacturing device, the manufacturing device is configured to rotate the dental object to be processed in front of the camera. This achieves the technical advantage, for example, that the dental object can be captured from different directions by the electronic camera. An image data set can be obtained from each of these directions, which in turn can be used to determine the control data. This allows the control data to be determined more accurately.

In another technically advantageous embodiment of the manufacturing device, the manufacturing device is configured to illuminate the dental object to be processed with light of one or more predetermined wavelengths. This achieves the technical advantage, for example, that the dental object can be illuminated with light of different wavelengths. An image data set can be obtained for each of these wavelengths, which in turn can be used to determine the control data. This also allows the control data to be determined more accurately.

In another technically advantageous embodiment of the manufacturing device, the controller includes a self-learning algorithm for determining the control data. This has the technical advantage, for example, that the controller can be taught to make different dental objects and suitable control data can be determined for each of them.

In another technically advantageous embodiment of the manufacturing device, the self-learning algorithm comprises an artificial neural network. This achieves the technical advantage, for example, that a determination of the control data can be carried out efficiently.

In a further technically advantageous embodiment of the manufacturing device, the controller is configured to determine a size, a type, a material and/or a processing step of the dental object to be manufactured on the basis of the image data set. This achieves the technical advantage, for example, of using properties of the dental object from which suitable control parameters can be determined.

In a further technically advantageous embodiment of the manufacturing device, the controller is configured to determine a position and/or an orientation of the dental object to be processed on the basis of the image data set. The position and/or orientation can also be determined with respect to an infrared camera. This has the technical advantage, for example, that suitable control parameters can also be determined from the position and/or an orientation.

In another technically advantageous embodiment of the manufacturing device, the manufacturing device comprises a firing furnace. This has the technical advantage that, for example, firing of the dental object can be automated.

In a further technically advantageous embodiment of the manufacturing device, the controller is configured to determine a temperature for manufacturing the dental object on the basis of the image data set. This has the technical advantage, for example, that the dental object can be fired at the correct temperature.

In another technically advantageous embodiment of the manufacturing device, the manufacturing device comprises a milling device. This has the technical advantage, that, for example, milling of the dental object can be automated.

In a further technically advantageous embodiment of the manufacturing device, the controller is configured to determine a milling parameter, a milling tool or the state of a milling tool of the dental object to be processed on the basis of the image data set. This has the technical advantage, that, for example, milling of the dental object can be performed correctly.

According to a second aspect, the technical task is solved by a manufacturing method for manufacturing a dental object, comprising the steps of capturing an image data set of the dental object to be processed by an electronic camera; and determining the control data for manufacturing the dental object on the basis of the image data set by a controller. The manufacturing method can be used to achieve the same advantages as with the manufacturing device according to the first aspect.

In a technically advantageous embodiment of the manufacturing method, the dental object is manufactured using the determined control data. This achieves the technical advantage, for example, that the manufacture of the dental object can be automated.

In a further technically advantageous embodiment of the manufacturing method, a size, a type, a material, a processing step of the dental object to be manufactured, or a number and/or a mutual distance of several dental objects to be processed is determined on the basis of the image data set. This has the technical advantage, for example, that a corresponding control can be carried out taking into account the number or the distance.

In another technically advantageous embodiment of the manufacturing method, the dental object is performed by a firing furnace, a milling device or a 3D printer. This achieves the technical advantage, for example, that the manufacturing method is performed in devices which are particularly suitable.

BRIEF DESCRIPTION OF THE DRAWINGS

Exemplary embodiments of the invention are shown in the drawings and are described in more detail below, in which.

DETAILED DESCRIPTION

Figure 1:
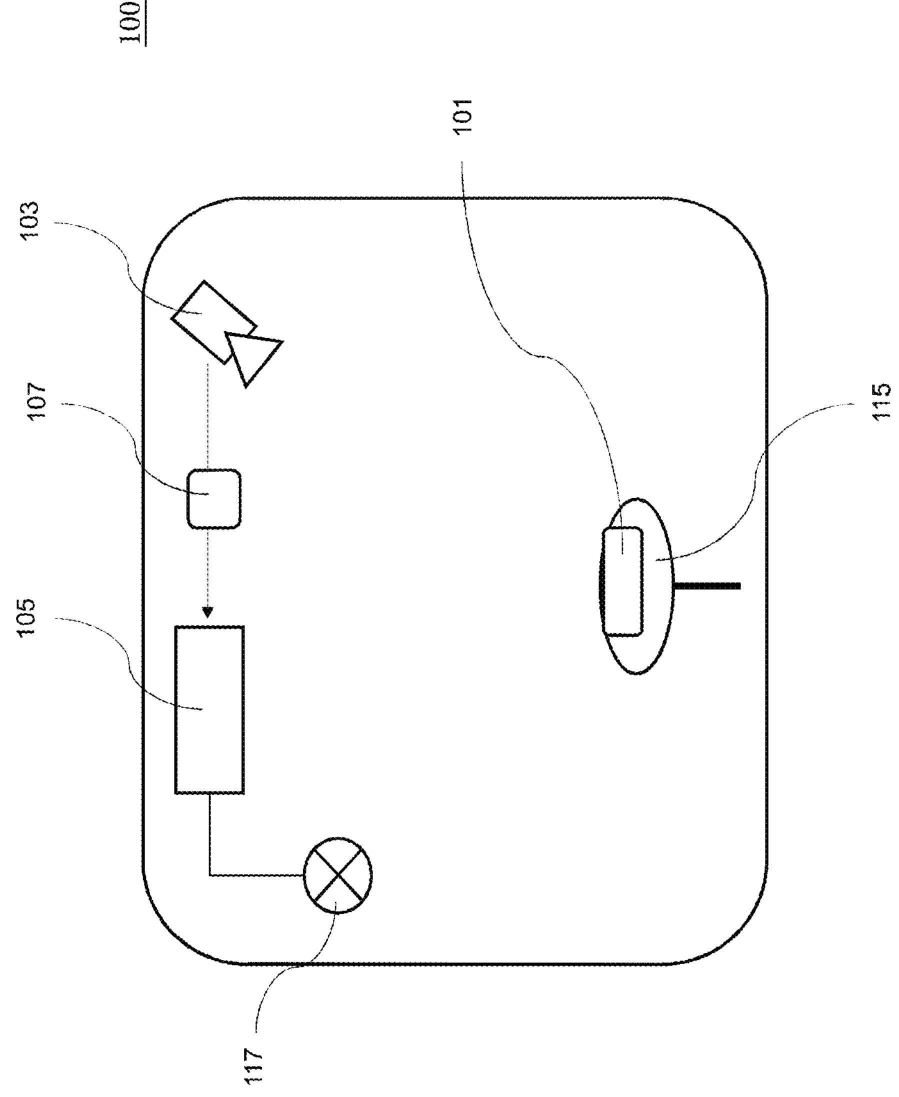
FIG. 1 shows a schematic illustration of a manufacturing device for a dental object.

FIG. 1 shows a schematic illustration of a manufacturing device 100 for a dental object 101. The dental object 101 is, for example, a crown, a bridge, a veneer, an abutment, an inlay, an onlay, a splint or a partial or full prosthesis in different manufacturing stages. In general, the dental object 100 can be any object in the dental field that is to be manufactured or processed as part of a manufacturing or processing method. For example, the manufacturing device 100 may be a firing furnace, a milling device, or a 3D printer. In general, the manufacturing device 100 can be any device that can be used as part of manufacturing or processing a dental object 101.

To manufacture a dental object 101, a user previously manually sets manufacturing parameters to be used as control data for the manufacturing device 100. For example, if a large restoration with a high mass is manufactured in a firing furnace as the manufacturing device 100, a different firing temperature should be selected than if a small restoration is fired. However, the correct control data for the manufacture of the dental object 101 is not always known to the user.

In addition, there are other factors, such as the selection of a suitable firing tray, a positioning of the restoration on the firing tray (in all three spatial directions) and the number of restorations and the distance between the restorations, which have an influence on the firing result. This can be advantageously used in a firing furnace. Furthermore, it also happens that during the development of the manufacturing devices and materials, new knowledge is gained on how best to operate the manufacturing device 100 or how to process the manufacturing materials. However, these new insights may be poorly communicated to a user of the manufacturing device 100.

Therefore, the manufacturing device 100 comprises an electronic camera 103 that optically captures the dental object 101 to be processed and generates a digital image data set 107. The image data set 107 may, for example, be in the form of a file in bitmap or JPG format and optically images the dental object 101. The manufacturing device 101 may comprise, for example, an additional rotary table 115 to rotate the dental object 101 in front of the camera 103. In this way, one or more image data sets 107 of the dental object 101 can be captured from different directions.

In addition, the manufacturing device 100 may comprise an adjustable light source 117 that can output light at different wavelengths. In this manner, the dental object 101 may be irradiated with light of a predetermined wavelength and one or more image data sets 107 may be obtained at the respective wavelength.

The manufacturing device 100 further comprises a controller 105 which analyzes the digital image data set 107 to generate control data for manufacturing the dental object 101. The controller 105 is generally used to control the manufacturing device 100. The image data set 107 may be stored in an external data storage device, such as a cloud or internet storage device.

For example, the controller 105 can determine from the image data set 107 a type of the dental object 101, the manufacturing material used, and/or the processing step in which the dental object 101 is. From these characteristics, control data for the dental object 101 can be automatically determined. For example, a specific manufacturing material can be assigned a firing temperature to be used as control data.

For this purpose, the controller 105 comprises a self-learning algorithm that has been previously trained by a plurality of image data sets 107 of different dental objects 101. The image data sets 107 for training purposes may have been captured from different directions and under light with different wavelengths. For each of these image data sets 107, the control data to be used is predetermined. To execute the self-learning algorithm, the controller 105 comprises a processor and a digital memory to store the self-learning algorithm and the image data set 107.

The controller 105 can be used to control manufacturing of the dental object 101. For example, the controller 105 executes predetermined control programs or sets certain control parameters, such as a firing temperature or firing time. In addition, the controller 105 can control the light source 117 or the rotary table 115.

When a new image data set 107 is provided to the self-learning algorithm, the self-learning algorithm may classify the image data set 107 and determine the control data to be used for manufacture. To this end, the self-learning algorithm may comprise, for example, an artificial neural network used to perform a similarity analysis of the image data sets 107. In this way, a user can obtain an optimal manufacturing result regardless of experience and training, automatically.

The results of the self-learning algorithm can be combined with conventional image data analysis to confirm the determined control data of the self-learning algorithm or to combine detected features. Subsequently, further decisions can be made based on the image analysis. This achieves the technical advantage that image data processing can be performed more quickly.

In addition, certain conditions of the manufacturing device 100, such as a calibration of a firing furnace, may be detected and recommendations and corrections may be issued to a user, such as for a position of a calibration body.

Subsequently, a manufacturing program may be started. The electronic camera 103 can also detect when the dental object 101 is placed in or removed from the manufacturing device 100. If the temperature is too high in a firing furnace in this case, a corresponding warning can be output to the user, such as acoustically or visually. In addition, a calibration body can be detected and measured, for example before and after the calibration program, and a correction parameter can be automatically determined.

Further, the positioning, alignment, and mutual spacing of the dental objects 101 in the manufacturing device 100 may be verified by an algorithm. For example, it is possible that dental objects 101 are closer together than recommended. In this case, an appropriate warning may also be output to the user, such as acoustically or visually. It is also possible to check how the dental object 101 is aligned or oriented in the manufacturing device 100 with respect to the camera 103. The camera 103 may be an RGB camera and/or an infrared camera (IR camera). The infrared camera may be used to control, for example, a removal temperature that is monitored. Based on the RGB camera, it can be determined beforehand which pixels are relevant in this regard. If the alignment or orientation of the dental object 101 deviates from a predefined alignment or orientation, a corresponding warning can also be issued to the user, such as acoustically or visually.

Figure 2:
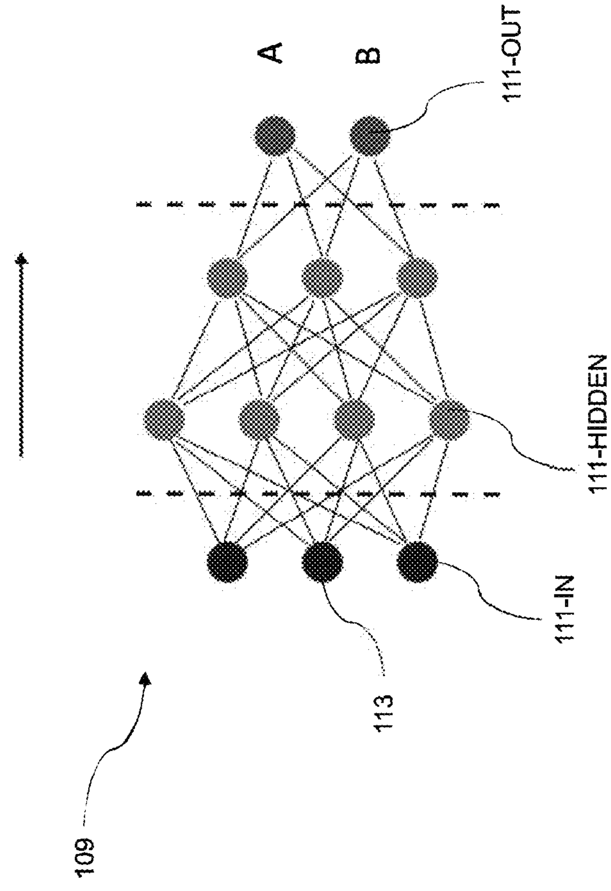
FIG. 2 shows a schematic view of a neural network.

FIG. 2 shows a schematic view of an artificial neural network 109. The artificial neural network 109 is a network of artificial neurons and may be used to determine control data. The artificial neural network 109 comprises an input layer 111-IN having a number of neurons 113 corresponding, for example, to the number of pixels in the image data set 107. In this case, each point from the image data set 107 is input to a separate neuron 113.

The information from the image data set 107 is forwarded to the neurons 113 of hidden layers 111-Hidden. Thereby, an individual weighting of each signal from one neuron 113 to another neuron 113 takes place. Then, the result is output at the output layer 111-OUT as control data A or B. For example, the number of neurons 113 of the output layer 111-OUT corresponds to the number of possible control data for manufacturing the dental object 101.

When the neural network 109 is taught, a plurality of image data sets 107 of which the respective control data is known are supplied. The neural network 109 learns by modifying the weights between the neurons 113, adjusting the weights of the neural network 109 until the output control data corresponds to the control data known for the image data set 107. If a new image data set 107 is subsequently input, the control data is output from a trained image data set 107 that has the greatest similarity to the input image data set 107.

In general, a combination of convolutional layers and fully connected layers (dense layers) can be used. Sigmoid, Tanh or ReLU functions can be used as activation functions. Batch normalization can be performed after each layer.

For example, the invention can be implemented by the following source code:

```
from tensorflow import keras
import CV2
# load neural net
model = keras.models.load_model("saved_models/model")
image = getimagefromcamera( )
image = cv2.rezise(img, (img_width, img_height) )
# classify image
```

-continued

```
pred_class = model.predict(image)
switch(pred_class) {
  case class1:
    return parameterset1;
  case class2:
    return parameterset2;
  case class3:
    return parameterset3;
};
```

Figure 3:
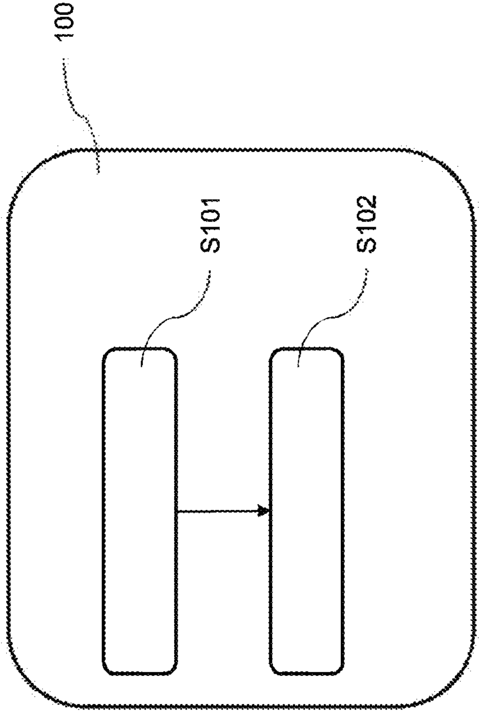
FIG. 3 shows a block diagram of a manufacturing method for manufacturing a dental object.

FIG. 3 shows a block diagram of a manufacturing method for manufacturing a dental object 101. In step S101, the image data set 107 of the dental objects 101 to be processed is captured by an electronic camera 103. In step S102, control data for manufacturing the dental object 101 is determined based on the image data set 107 by the controller 105.

Subsequently, the dental object 101 is manufactured or processed using the determined control data. In this way, a manufacture of the dental object 101 can be automated and simplified.

If the manufacturing device 100 is a firing furnace, the controller 105 may determine, for example, a temperature and a firing time as control data for manufacturing the dental object 101 based on the image data set 107. If the manufacturing device 100 is a milling device, the controller 105, may determine a milling parameter, such as a rotational speed, or a milling tool to be used as control data for the dental object 101 to be processed. In general, the control data may comprise any data that can be used to manufacture the dental object 101.

Based on the image data set 107, a size, a volume, a type, a material and/or a processing step of the dental object 101 to be manufactured can also be determined. In turn, these properties of the dental object 101 can then each be assigned specific control data for manufacturing the dental object 101. Furthermore, a position and/or an orientation of the dental object 101 to be processed can be determined based on the image data set 107. These properties of the dental object 101 can then also in turn each be assigned specific control data for the manufacture of the dental object 101.

All of the features explained and shown in connection with individual embodiments of the invention may be provided in different combinations in the subject matter of the invention to simultaneously realize their beneficial effects.

All process steps can be implemented by devices which are suitable for executing the respective process step. All functions that are executed by the features of the subject-matter can be a method step of a method.

In some embodiments, the innovations may be implemented in diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power.

A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown in the figures.

REFERENCE SIGN LIST

100 manufacturing device
101 dental object
103 electronic camera
105 control device or controller
107 image data set
109 neural network
111-IN input layer
111-OUT output layer
113 neuron
115 rotary table
117 light source

The invention claimed is:

1. A manufacturing method for manufacturing a dental object, comprising the steps of:
- capturing an image data set of the dental object to be processed by an electronic camera;
- determining control data for manufacturing the dental object based on the image data set by a controller using a self-learning algorithm, wherein the control data comprises a firing temperature or a firing time for firing the dental object;
- wherein the self-learning algorithms for determining the control data is previously trained by a plurality of image data sets of different dental objects.

2. The manufacturing method according to claim 1, wherein the dental object is manufactured using the determined control data.

3. The manufacturing method according to claim 1, wherein a size, a type, a material, a processing step of the dental object to be manufactured, or a number and/or a mutual distance of several dental objects to be processed is determined based on the image data set.

4. The manufacturing method according to claim 1, wherein the dental object is processed by a firing furnace.

5. A manufacturing device for manufacturing a dental object, comprising:
- an electronic camera for capturing an image data set of the dental object to be processed; and
- a controller for determining control data for manufacturing the dental object on the basis of the image data set,
- wherein the manufacturing device comprises a firing furnace,
- wherein the control data comprises a firing temperature or a firing time;
- wherein the controller comprises a self-learning algorithm for determining the control data;
- wherein the self-learning algorithm for determining the control data is previously trained by a plurality of image data sets of different dental objects.

6. The manufacturing device according to claim 5, wherein the manufacturing device is configured to rotate the dental object to be processed in front of the camera.

7. The manufacturing device according to claim 5, wherein the manufacturing device is configured to illuminate the dental object to be processed with light of one or more predetermined wavelengths.

8. The manufacturing device according to claim 5, wherein the self-learning algorithm comprises an artificial neural network.

9. The manufacturing device according to claim 5, wherein the controller is configured to determine a size, a type, a material and/or a processing step of the dental object to be manufactured based on the image data set.

10. The manufacturing device according to claim 5, wherein the controller is configured to determine a position and/or an orientation of the dental object to be processed based on the image data set.

11. The manufacturing device according to claim 5, wherein the controller is configured to determine a temperature for manufacturing the dental object based on the image data set.

12. The manufacturing device according to claim 5, wherein the image data sets are captured from different directions and under light having different wavelengths.

* * * * *